(12) United States Patent
Teig et al.

(10) Patent No.: US 12,175,368 B2
(45) Date of Patent: Dec. 24, 2024

(54) TRAINING SPARSE NETWORKS WITH DISCRETE WEIGHT VALUES

(71) Applicant: Perceive Corporation, San Jose, CA (US)

(72) Inventors: Steven L. Teig, Menlo Park, CA (US); Eric A. Sather, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 17/982,448

(22) Filed: Nov. 7, 2022

(65) Prior Publication Data

US 2023/0084673 A1    Mar. 16, 2023

Related U.S. Application Data

(63) Continuation of application No. 15/921,622, filed on Mar. 14, 2018, now Pat. No. 11,537,870.

(Continued)

(51) Int. Cl.
  *G06N 3/08*     (2023.01)
  *G06N 3/084*    (2023.01)
  (Continued)

(52) U.S. Cl.
  CPC .............. *G06N 3/08* (2013.01); *G06N 3/084* (2013.01); *G06N 7/01* (2023.01); *H04L 1/24* (2013.01)

(58) Field of Classification Search
  CPC ........... G06N 3/08; G06N 3/084; G06N 7/005
  See application file for complete search history.

(56) References Cited

U.S. PATENT DOCUMENTS 5,255,347 A    10/1993  Matsuba et al.
6,000,833 A *  12/1999  Gershenfeld .......... G10H 3/125
                                                       703/2

(Continued)

FOREIGN PATENT DOCUMENTS

CN    107248003 A    10/2017

OTHER PUBLICATIONS

Shayer et al. ("Learning Discrete Weights Using the Local Reparameterization Trick", Feb. 2, 2018) (Year: 2018).*

(Continued)

*Primary Examiner* — Michael J Huntley
*Assistant Examiner* — Imad Kassim
(74) *Attorney, Agent, or Firm* — K&L Gates LLP

(57) ABSTRACT

Some embodiments provide a method for training a machine-trained (MT) network. The method propagates multiple inputs through the MT network to generate an output for each of the inputs. each of the inputs is associated with an expected output, the MT network uses multiple network parameters to process the inputs, and each network parameter of a set of the network parameters is defined during training as a probability distribution across a discrete set of possible values for the network parameter. The method calculates a value of a loss function for the MT network that includes (i) a first term that measures network error based on the expected outputs compared to the generated outputs and (ii) a second term that penalizes divergence of the probability distribution for each network parameter in the set of network parameters from a predefined probability distribution for the network parameter.

18 Claims, 8 Drawing Sheets

Related U.S. Application Data

(60) Provisional application No. 62/627,407, filed on Feb. 7, 2018.

(51) Int. Cl.
   *G06N 7/01* (2023.01)
   *H04L 1/24* (2006.01)

(56) References Cited

U.S. PATENT DOCUMENTS

| | | | |
|---|---|---|---|
| 6,119,111 | A | 9/2000 | Gross et al. |
| 7,333,923 | B1 | 2/2008 | Yamanishi et al. |
| 8,315,962 | B1 | 11/2012 | Horne |
| 10,019,654 | B1 | 7/2018 | Pisoni |
| 11,468,313 | B1 | 10/2022 | Naumov et al. |
| 11,537,870 | B1 | 12/2022 | Teig et al. |
| 2013/0138589 | A1 | 5/2013 | Yu et al. |
| 2016/0086078 | A1 | 3/2016 | Ji et al. |
| 2016/0174902 | A1 | 6/2016 | Georgescu et al. |
| 2016/0239706 | A1 | 8/2016 | Dijkman et al. |
| 2016/0328643 | A1 | 11/2016 | Liu et al. |
| 2017/0140298 | A1 | 5/2017 | Wabnig et al. |
| 2017/0161640 | A1 | 6/2017 | Shamir |
| 2017/0206464 | A1 | 7/2017 | Clayton et al. |
| 2017/0351948 | A1 | 12/2017 | Lee et al. |
| 2018/0046900 | A1 | 2/2018 | Dally et al. |
| 2018/0095004 | A1* | 4/2018 | Ide .................. G06N 7/01 |
| 2018/0107925 | A1 | 4/2018 | Choi et al. |
| 2018/0114113 | A1* | 4/2018 | Ghahramani ....... G06N 3/082 |
| 2018/0165554 | A1 | 6/2018 | Zhang et al. |
| 2018/0240042 | A1 | 8/2018 | Boada et al. |
| 2018/0315399 | A1* | 11/2018 | Kaul ................ G06F 9/30014 |
| 2018/0373975 | A1 | 12/2018 | Yu et al. |
| 2019/0005358 | A1 | 1/2019 | Pisoni |
| 2019/0138896 | A1 | 5/2019 | Peng |
| 2019/0188557 | A1 | 6/2019 | Lowell et al. |

OTHER PUBLICATIONS

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.

Courbariaux, Matthieu, et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Deng, Lei, et al., "GXNOR-Net: Training Deep Neural Networks with Ternary Weights and Activations without Full-Precision Memory under a Unified Discretization Framework," Neural Networks 100, Feb. 2018, 10 pages, Elsevier.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Kingma, Diederik P., et al., "Auto-Encoding Variational Bayes," May 1, 2014, 14 pages, arXiv:1312.6114v10, Computing Research Repository (CoRR)—Cornell University, Ithaca, NY, USA.

Kingma, Diederik P., et al., "Variational Dropout and the Local Reparameterization Trick," Proceedings of the 28th International Conference on Neural Information Processing Systems (NIPS '15), Dec. 7-12, 2015, 14 pages, MIT Press, Montreal, Canada.

Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.

Li, Fengfu, et al., "Ternary Weight Networks," May 16, 2016, 9 pages, arXiv:1605.04711v1, Computing Research Repository (CoRR)—Cornell University, Ithaca, NY, USA.

Li, Hong-Xing, et al., "Interpolation Functions of Feedforward Neural Networks," Computers & Mathematics with Applications, Dec. 2003, 14 pages, vol. 46, Issue 12, Elsevier Ltd.

Louizos, Christos, et al., "Bayesian Compression for Deep Learning," Proceedings of Advances in Neural Information Processing Systems 30 (NIPS 2017), Dec. 4-9, 2017, 17 pages, Neural Information Processing Systems Foundation, Inc., Long Beach, CA, USA.

Marchesi, M., et al., "Multi-layer Perceptrons with Discrete Weights", 1990 International Joint Conference on Neural Networks, Jun. 17-21, 1990, 8 pages, IEEE, San Diego, CA, USA.

Molchanov, Dmitry, et al., "Variational Dropout Sparsifies Deep Neural Networks," Feb. 27, 2017, 10 pages, arXiv:1701.05369v2, Computing Research Repository (CoRR)—Cornell University, Ithaca, NY, USA.

Neklyudov, Kirill, et al., "Structured Bayesian Pruning via Log-Normal Multiplicative Noise," Proceedings of the 31st Conference on Neural Information Processing Systems (NIPS 2017), Dec. 4-9, 2017, 10 pages, ACM, Long Beach, CA, USA.

Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.

Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.

Rutenbar, Rob A., et al., "Hardware Inference Accelerators for Machine Learning," 2016 IEEE International Test Conference (ITC), Nov. 15-17, 2016, 39 pages, IEEE, Fort Worth, TX, USA.

Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Vaswani, Sharan, "Exploiting Sparsity in Supervised Learning," Month Unknown 2014, 9 pages, retrieved from https://vaswanis.github.io > optimization_report.

Wang, Peiqi, et al., "HitNet: Hybrid Ternary Recurrent Neural Network," 32nd Conference on Neural Information Processing Systems (NeurIPS '18), Dec. 2018, 11 pages, Montreal, Canada.

Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.

Yan, Shi, "L1 Norm Regularization and Sparsity Explained for Dummies," Aug. 27, 2016, 13 pages, retrieved from https://blog.mlreview.com/l1-norm-regularization-and-sparsity-explained-for-dummies-5b0e4be3938a.

(56) References Cited

OTHER PUBLICATIONS

Yang, Tien-Ju, et al., "Designing Energy-Efficient Convolutional Neural Networks using Energy-Aware Pruning," Apr. 18, 2017, 9 pages, arXiv:1611.05128v4, Computer Research Repository (CoRR)—Cornell University, Ithaca, NY, USA.

* cited by examiner

TRAINING SPARSE NETWORKS WITH DISCRETE WEIGHT VALUES

CLAIM OF BENEFIT TO PRIOR APPLICATIONS

This application is a continuation application of U.S. patent application Ser. No. 15/921,622, filed Mar. 14, 2018. U.S. patent application Ser. No. 15/921,622 claims the benefit of U.S. Provisional Patent Application 62/627,407, filed Feb. 7, 2018. U.S. patent application Ser. No. 15/921,622 is incorporated herein by reference.

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), and Neural Turing Machines (NTM).

Neural networks typically involve many (e.g., thousands, millions, or even potentially billions) of weights that are calculated during training and then used when the neural network is embedded into a device. These weights are generally floating-point values (e.g., 32-bit values), such that in total they occupy a large amount of memory. More recently, techniques have been introduced to solve this issue in part by creating very sparse networks (i.e., with most weight values set to zero), as this can reduce the amount of memory occupied by these networks. However, these techniques are still applied to floating point networks, such that each non-zero weight uses a large number of bits.

BRIEF SUMMARY

Some embodiments of the invention train the parameters of a machine-trained (MT) network using techniques designed to maximize the number of parameters that are assigned a value of zero, with each of the parameters having a discrete set of possible values (including zero) prior to training. In some embodiments, the network is a multi-layer network that includes a layer of one or more input nodes, a layer of one or more output nodes, and one or more layers of hidden (interior) nodes. Each node produces an output value based on one or more input values. Specifically, each hidden node and output node, in some embodiments, bases its output value on a set of input values (e.g., the output values of a set of other nodes, such as some or all of the nodes of the previous layer). To compute this output value, some or all of these nodes use a set of parameters (also called weight values) to linearly combine the input values of the node (and may also follow this by applying a non-linear function to the linear combination).

In some embodiments, these weights are each defined during training as a probability distribution across a set of possible values for the weight. To train the weights, a training system of some embodiments propagate numerous inputs, for which expected outputs (ground truth outputs) are known, through the network in order to generate outputs. The training system then calculates the value of a loss function for the network and backpropagates the loss function to modify the probability distributions of the weight values.

This loss function, in some embodiments, includes (i) a first term that measures the network error based on a comparison of the expected outputs to the actual outputs generated by the network and (ii) a second term that penalizes divergence of the probability distribution for each weight from a predefined probability distribution for the weight. In different embodiments, the weights may all have the same predefined probability distribution or may have different predefined probability distributions. For instance, in some embodiments, the predefined probability distribution is the same for all weights in a layer of nodes but may vary between layers.

As mentioned, each weight is assigned a discrete set of possible values, and in some embodiments the probability distribution for each weight is distributed among the possible values for the weight as a categorical distribution (i.e., the sum of all of the probabilities adds to exactly 1). The discrete set of possible values differs between different embodiments. Some embodiments use ternary weight values of zero, a non-zero value, and a negative of the nonzero value (e.g., the set {0, 1, −1}). Other embodiments use other sets of possible values, such as zero along with powers of two multiplied by a constant value. In general, the discrete set of possible weight values will include the value zero, as one goal of some embodiments is to increase the number of weight values that equal zero after training is complete.

In order to achieve this goal, the predefined probability distributions for the weights includes a large probability (greater than 0.5, and in many cases close to 1) that the value is zero in some embodiments. As a result, the second term in the loss function described above, that measures divergence from the predefined probability distributions, increases as the probability distributions for the weights includes greater probabilities for the non-zero values. On the other hand, because having all weights set to zero would result in a network that does not provide meaningful outputs, some of the weights will end up with higher probabilities for non-zero values so as to lower the first term in the loss function that measures error in the network's output.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
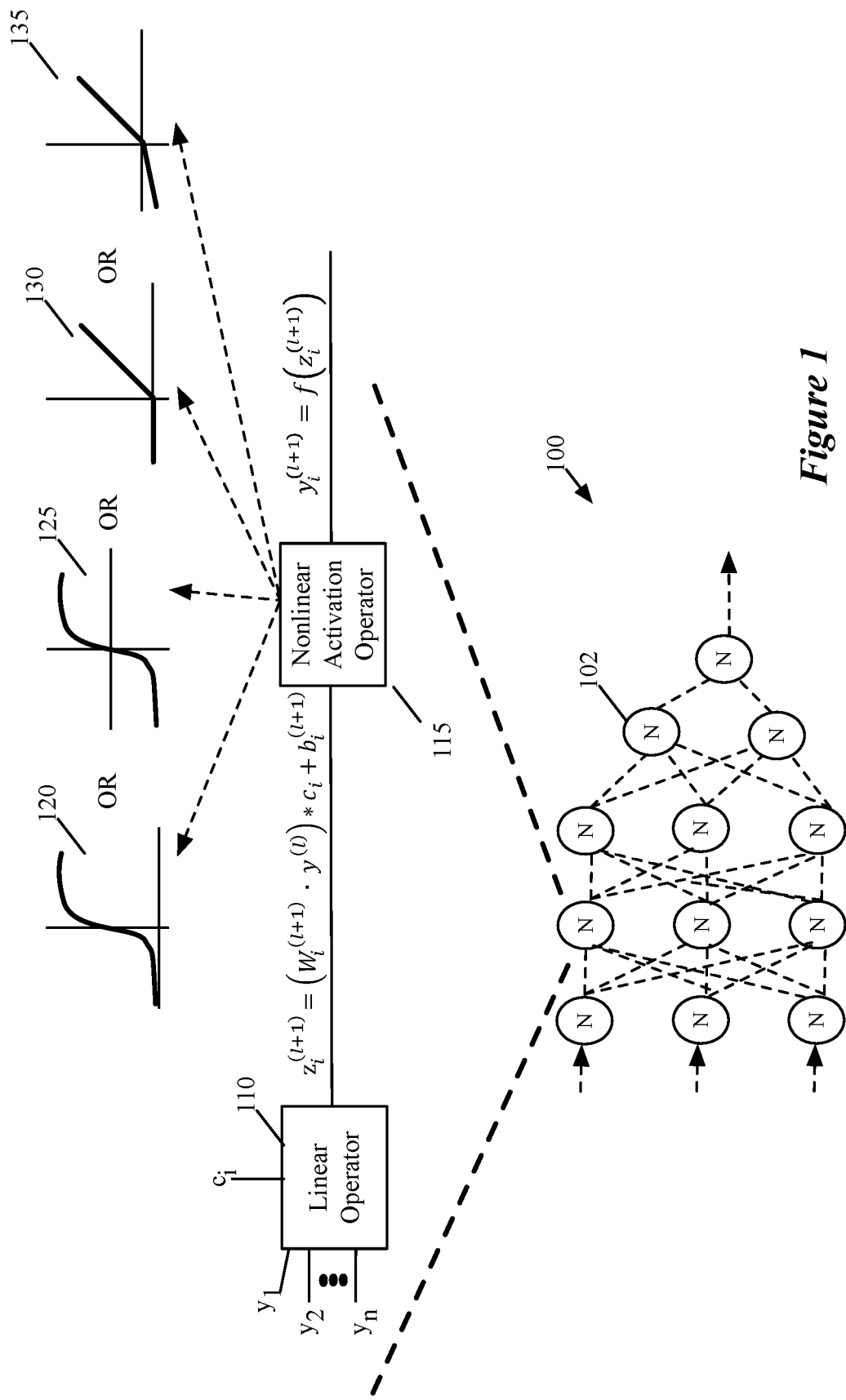
FIG. 1 illustrates an example of a multi-layer machine-trained network of some embodiments.

Some embodiments of the invention train the parameters of a machine-trained (MT) network using techniques designed to maximize the number of parameters that are assigned a value of zero, with each of the parameters having a discrete set of possible values (including zero) prior to training. In some embodiments, the network is a multi-layer network that includes a layer of one or more input nodes, a layer of one or more output nodes, and one or more layers of hidden (interior) nodes. Each node produces an output value based on one or more input values. Specifically, each hidden node and output node, in some embodiments, bases its output value on a set of input values (e.g., the output values of a set of other nodes, such as some or all of the nodes of the previous layer). To compute this output value, some or all of these nodes use a set of parameters (also called weight values) to linearly combine the input values of the node (and may also follow this by applying a non-linear function to the linear combination).

In some embodiments, these weights are each defined during training as a probability distribution across a set of possible values for the weight. To train the weights, a training system of some embodiments propagate numerous inputs, for which expected outputs (ground truth outputs) are known, through the network in order to generate outputs. The training system then calculates the value of a loss function for the network and backpropagates the loss function to modify the probability distributions of the weight values.

This loss function, in some embodiments, includes (i) a first term that measures the network error based on a comparison of the expected outputs to the actual outputs generated by the network and (ii) a second term that penalizes divergence of the probability distribution for each weight from a predefined probability distribution for the weight. In different embodiments, the weights may all have the same predefined probability distribution or may have different predefined probability distributions. For instance, in some embodiments, the predefined probability distribution is the same for all weights in a layer of nodes, but may vary between layers.

As mentioned, each weight is assigned a discrete set of possible values, and in some embodiments the probability distribution for each weight is distributed among the possible values for the weight as a categorical distribution (i.e., the sum of all of the probabilities adds to exactly 1). The discrete set of possible values differs between different embodiments. Some embodiments use ternary weight values of zero, a non-zero value, and a negative of the nonzero value (e.g., the set $\{0, 1, -1\}$). Other embodiments use other sets of possible values, such as zero along with powers of two multiplied by a constant value. In general, the discrete set of possible weight values will include the value zero, as one goal of some embodiments is to increase the number of weight values that equal zero after training is complete.

In order to achieve this goal, the predefined probability distributions for the weights includes a large probability (greater than 0.5, and in many cases close to 1) that the value is zero in some embodiments. As a result, the second term in the loss function described above, that measures divergence from the predefined probability distributions, increases as the probability distributions for the weights includes greater probabilities for the non-zero values. On the other hand, because having all weights set to zero would result in a network that does not provide meaningful outputs, some of the weights will end up with higher probabilities for non-zero values so as to lower the first term in the loss function that measures error in the network's output.

The above description introduces the network training process of some embodiments for training sparse networks using discrete weight values. Several more detailed embodiments are described below. First, Section I describes the use and training of machine-trained networks generally. Next, Section II describes the mathematical basis for using Variational Bayes Inference for quantized weight values, while Section III describes the network training process in detail. Section IV then describes the incorporation of a machine-trained network into a device. Finally, Section V describes an electronic system with which some embodiments of the invention are implemented.

I. Neural Networks

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value). In this example, the neural network 100 only has one output node. Other neural networks of other embodiments have several output nodes that provide more than one output value. In addition, the neural networks of other embodiments may be types of networks other than feed forward networks (e.g., recurrent networks, etc.).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous stage node that the linear operator receives) plus an offset. Similarly, the linear component 110 of each input node of some embodiments computes a dot product of a vector of weight coefficients and a vector of input values, plus an offset. In other embodiments, each input node receives a single input and passes that input as its output. As described below, in some embodiments, rather than use defined weight values, during training of the neural network the weight values are treated as probability distributions, with the linear component computing an output mean and variance based on these probability distributions. Each node's nonlinear component 115 computes a function based on the output of the node's linear component 110. This function is commonly referred to as the activation function.

The notation of FIG. 1 can be described as follows. Consider a neural network with L hidden layers (i.e., L layers that are not the input layer or the output layer). The variable l can be any of the hidden layers (i.e., l∈{1, ..., L−1} index the hidden layers of the network, with l=0 representing the input layer and l=L representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n}\left(w_{ik}^{(l+1)} * y_k^{(l)}\right)*c_i + b_i^{(l+1)}. \quad (A)$$

The constant value $c_i$ is a value to which all the weight values are normalized. In some embodiments, the constant value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.)

The output $y^{(l+1)}$ of the nonlinear component 115 of a node in layer l+1 is a function of the node's linear component, and can be expressed as by Equation (B) below:

$$y_i^{(l+1)} = f(z_i^{(l+1)}). \quad (B)$$

In this equation, $f$ is the nonlinear activation function for node i. Examples of such activation functions include a sigmoid function 120 ($f(x)=1/(1+e^{-x})$), a tan h function 125, a ReLU (rectified linear unit) function 130 or a leaky ReLU function 135, as shown.

Traditionally, the sigmoid function and the tan h function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C):

$$y_i^{(l+1)} = f(z_i^{(l+1)}) = f\left[\left(\sum_{k=1}^{n} w_{ik} * y_k\right) * c_i + b_i^{(l+1)}\right]. \quad (C)$$

In this equation, $w_{ik}$ are weight values associated with the inputs $y_k$ of the node i in layer l+1.

In some embodiments, the neural network is a convolutional feed-forward neural network. In this case, the intermediate layers (referred to as "hidden" layers) may include convolutional layers, pooling layers, fully-connected layers, and normalization layers. The convolutional layers of some embodiments use a small kernel (e.g., 5 pixels×5 pixels) to process each tile of pixels in an image with the same set of parameters. Pooling layers combine the outputs of clusters of nodes from one layer into a single node at the next layer, as part of the process of reducing an image (which may have a large number of pixels) or other input item down to a single output (e.g., a vector output).

Before a multi-layer network can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight coefficients). As mentioned, some embodiments use a loss function that balances the network accuracy against the desire for sparsity (having as many weights set to zero as possible).

II. Variational Bayes Inference for Quantized Weights

As mentioned, some embodiments train the weights of a network using techniques designed to maximize the number of parameters that are assigned a value of zero, with each of the parameters having a discrete set of possible values (including zero) prior to training. Specifically, some embodiments define each weight as a probability distribution across a set of possible values for the weight. To train the weights, numerous inputs, for which expected outputs are known, are propagated through the network in order to generate outputs. The training system then calculates the value of a loss function for the network and backpropagates the loss function to modify the probability distributions of the weight values. The loss function of some embodiments, balances the network error (based on comparing the expected outputs to the actual outputs) with a penalty for the use of non-zero weight values. This penalty term uses the divergence of the probability distributions for the weights from the predefined probability distribution in some embodiments, based on the concepts of Variational Bayes Inference (VBI).

A. Discrete Weight Spectrum

As mentioned, each weight is assigned a discrete set of possible values, and in some embodiments the probability distribution for each weight is distributed among the possible values for the weight as a categorical distribution (i.e., the sum of all of the probabilities adds to exactly 1). In some embodiments, the spectrum of possible weight values is different for each layer of the network. For any given layer, the spectrum is described as $\{s_i | i \in S\}$. For simplicity, the following description considers a single network layer, so as to remove the layer index.

In general, the discrete set of possible weight values will include the value zero, as one goal of some embodiments is to increase the number of weight values that equal zero after training is complete. The actual discrete spectrum of possible values differs between different embodiments. Some embodiments use ternary weight values of zero, a non-zero value, and a negative of the nonzero value (e.g., the set {0, 1, −1}). Other embodiments use other sets of possible values, such as zero along with powers of two multiplied by a constant value:

$$s_i = \begin{cases} 0, & i = 0 \\ \alpha 2^{|i|-1} \text{sign}(i), & i = \pm 1, \pm 2, \ldots, \pm n \end{cases}. \quad (D)$$

In the above equation, the overall scale of weights in the layer is controlled by the layer-dependent $\alpha$, and the number of distinct weight values in the layer is $|S|=2n+1$. One advantage of such a weight spectrum is that the dot products of the inputs and weights in the eventual trained network can be implemented using shifters rather than multipliers, aside from the overall multiplication by $\alpha$.

B. Categorical Distribution

As noted, some embodiments define a probability distribution over the discrete spectrum of possible weight values for each weight in a layer. This probability distribution is a categorical distribution (or multinoulli distribution), meaning that all of the probabilities are between 0 and 1 (inclusive), and the sum of all of the probabilities is exactly equal to 1. The predefined, or prior, distribution, is referred to as p and the posterior (resultant) distribution is referred to as q. For any $i \in S$, $p_i$ is the prior probability that the weight takes on value $s_i$ and $q_i$ is the posterior probability that the weight takes on value $s_i$.

Figure 2:
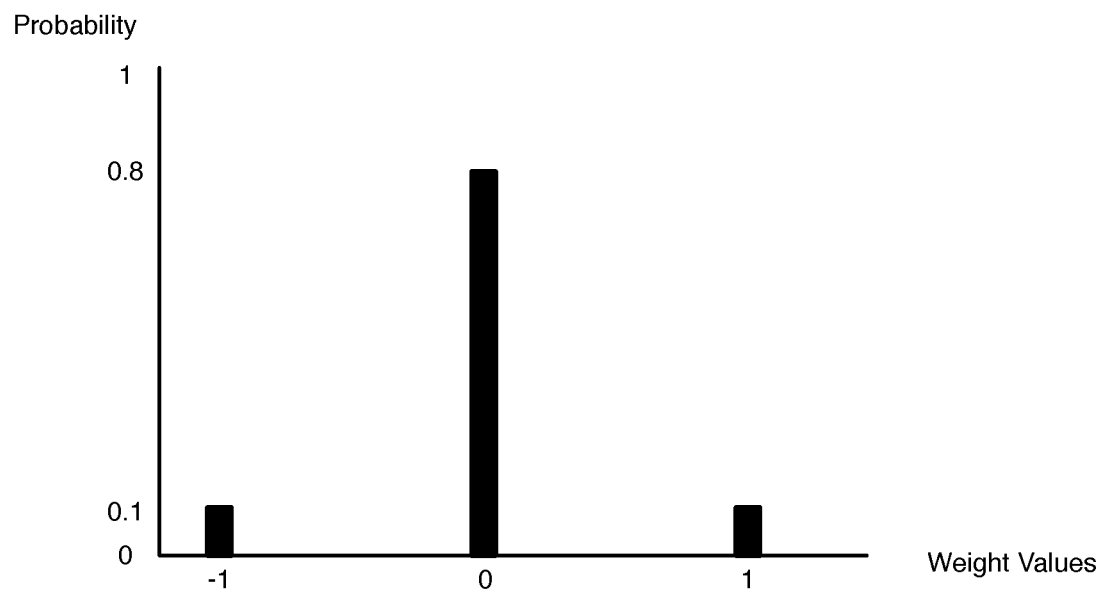
FIGS. 2 and 3 illustrate two different possible weight value spectrums, with a possible predefined probability distribution for each spectrum.
Figure 3:
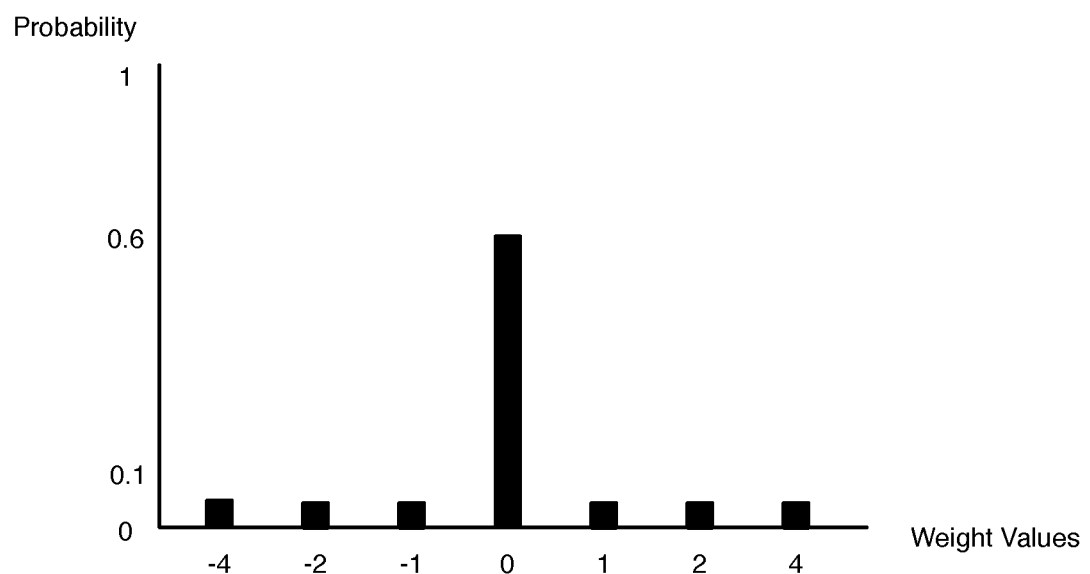

FIGS. 2 and 3 illustrate two different possible weight value spectrums, with a possible predefined probability distribution for each spectrum. First, FIG. 2 illustrates a ternary weight spectrum with possible weight values of 0, 1, and −1 (some embodiments will use a random scaling factor $\alpha$, for possible weight values of 0, $\alpha$, and $-\alpha$). In this example, the predefined (prior) probability distribution assigns 0.1 to each of the possible weight values 1 and −1, and assigns the remaining 0.8 to the value 0. In the case (as in this example) in which the negative and positive weight values are assigned the probability, then the equation $$p_1 = p_{-1} = \frac{1 - p_0}{2}$$

applies. In some embodiments that use quinary or other larger spectra, other distributions may be used (e.g., all non-zero values are assigned the same probability, the probabilities fall off as the distance from zero increases, etc.

FIG. 3 illustrates a powers-of-2 weight spectrum according to Equation (D), with possible weight values of 0, 1, −1, 2, −2, 4, and −4. As indicated in this equation above, the weight value spectrum may also be scaled by a random layer-specific scaling value a in some embodiments. In this example, the predefined probability distribution assigns 0.05 to each of the six non-zero weight values (1, −1, 2, −2, 4, and −4), and assigns 0.6 to the value 0. In both of these illustrated cases, the highest probability is assigned to the value 0. As such, each weight that diverges from the value 0 (i.e., is assigned a different weight in the spectrum) is penalized in the loss function. However, as these weights can also reduce the network error, some of the weights are assigned non-zero values.

The variable $x_i$ refers to the random Boolean variable that is 1 if weight value $s_i$ is selected, and 0 if a different weight value in the spectrum is selected. The posterior probability of the vector x is then $$P(x|q) = \prod_{i \in S} q_i^{x_i} = \exp\left\{\sum_{i \in S} x_i \ln q_i\right\}. \quad (E)$$

Because exactly one weight value is actually selected, the sum over all of the $x_i$ is 1 ($\Sigma_{i \in S} x_i = 1$). As a result, one of the $x_i$ can be eliminated. Choosing $x_0$ (with $s_0=0$), this value can be expressed in terms of the other components of the vector x:

$$x_0 = 1 - \sum_{\substack{i \in S \\ i \neq 0}} x_i. \quad (F)$$

This means that the posterior distribution for x can be expressed as the following:

$$P(x|q) = \exp\left\{\sum_{\substack{i \in S \\ i \neq 0}} x_i \ln \frac{q_i}{q_0} - \ln \frac{1}{q_0}\right\}. \quad (G)$$

With the dependent variable $x_0$ eliminated, the revised probability distribution P(x|q) is defined over the space:

$$0 \leq \sum_{\substack{i \in S \\ i \neq 0}} x_i \leq 1. \quad (H)$$

Because $q_0$ is determined by the other $q_i$, as shown by the following equation, $$q_0 = 1 - \sum_{\substack{i \in S \\ i \neq 0}} q_i, \quad (I)$$

the distribution P(x|q) is fully parameterized by the subset of probability parameters $\{q_i: i \in S, i \neq 0\}$. In the ternary case, this means that each weight is constrained to a 2-dimensional space (because the probabilities add up to 1, the third weight value probability can be determined based on the other two).

1. Natural Parameters

The categorical distribution shown in equation (G) is a member of the exponential family of probability distributions. In general, members of the exponential family have probability distributions that can be reparametrized using the general form $$P(x|q) = h(x) \exp\{\eta^T T(x) - A(\eta)\}. \quad (J)$$

In this expression, T(x) is referred to as the sufficient statistic, which fully summarizes the data x within the density function. Compared with equation (G), it can be seen that the sufficient statistic is equal to x itself. The natural parameters of the distribution, $\eta_i$ (the set of values for which P(x|q), show in Equation (J), is finite) are given as $$\left\{\eta_i = \ln \frac{q_i}{q_0}: i \in S, i \neq 0\right\}. \quad (K)$$

The natural parameters in this reparameterization have the benefit that the valid range (for each of the $\eta_i$) is all of $\mathbb{R}$ (the real number space). This is the case due to the elimination of $x_0$ and $q_0$, without which the probabilities are restricted by the equation $\Sigma_{i \in S} q_i = 1$. The benefit of expanding the valid range for the parameters to the entire real number space is that clipping need not be required during backpropagation. If modifying the $q_i$ during the gradient step of backpropagation, some embodiments clip these values to stay within the probability simplex of 0-1. However, the natural parameters do not require such clipping, meaning that all data can be preserved.

For notational convenience, the vector $\eta_i = \ln(q_i/q_0)$ can be extended to include a zero component, $\eta_0 = \ln(q_0/q_0) = 0$. As a result, $$1 = \sum_{i \in S} q_i = q_0 \sum_{i \in S} \frac{q_i}{q_0} = q_0 \sum_{i \in S} e^{\eta_i}, \qquad (L)$$

so that $q_0$ is given by $$q_0 = \frac{1}{\sum_{i \in S} e^{\eta_i}}. \qquad (M)$$

The original parameters of the categorical distribution (the $q_i$) can therefore be computed in terms of the natural parameters using the soft-max function $$q_i = \frac{e^{\eta_i}}{\sum_{j \in S} e^{\eta_j}}. \qquad (N)$$

$A(\eta)$ is the cumulant-generating function, which is used (as shown below in the next sub-section) to define the mean, variance, and other cumulants. This function for the probability distribution shown in Equation (J) is given by $$A(\eta) = \ln \frac{1}{q_0} = \ln \left( \sum_{i \in S} e^{\eta_i} \right). \qquad (O)$$

An advantage of treating the categorical distribution as a member of the exponential family is that the properties of such a distribution are well-known, as are the results for the mean, variance, Kullback-Leibler (KL) divergence, and other properties.

2. Cumulants

The mean, variance, and other cumulants of an exponential distribution can be computed as derivatives of the cumulant-generating function, given above by Equation (O), with respect to the natural parameters. The mean, in this case, is given by $$\bar{x} \equiv \mathbb{E}[x_i] = \mathbb{E}[T(x)_i] = \frac{\partial A(\eta)}{\partial \eta_i} = q_i, \qquad (P)$$

the covariance is given by $$\mathrm{Cov}[x_i, x_j] = \mathrm{Cov}[T(x)_i, T(x)_j] = \frac{\partial^2 A(\eta)}{\partial \eta_i \partial \eta_j} = q_i \delta_{ij} - q_i q_j, \qquad (Q)$$

and the coskewness is given by $$\mathrm{Coskew}[x_i, x_j, x_k] = \mathbb{E}[(x_i - \bar{x}_i)(x_j - \bar{x}_j)(x_k - \bar{x}_k)] \qquad (R)$$
$$= \mathrm{Coskew}[T(x)_i, T(x)_j, T(x)_k]$$
$$= \frac{\partial^3 A(\eta)}{\partial \eta_i \partial \eta_j \partial \eta_k}$$
$$= q_i \delta_{ij} \delta_{ki} - q_i q_j \delta_{jk} - q_j q_k \delta_{ki} - q_k q_i \delta_{ij} - 2 q_i q_j q_k$$

3. Weight Mean and Variance

For forward and backward propagation of data through the MT network, some embodiments require the mean and variance of the weights, not just of the natural parameters. The cumulants shown in the above subsection can be used to compute the mean and variance of each of the weights, as shown by the following:

$$\mu \equiv \mathbb{E}\left[\sum_{i \in S} x_i s_i\right] = \sum_{i \in S} q_i s_i, \qquad (S)$$

$$\sigma^2 \equiv \mathrm{Var}[w] = \sum_{i,j \in S} s_i s_j \mathrm{Cov}[x_i, x_j] = \sum_{i \in S} q_i s_i^2 - \left(\sum_{i \in S} q_i s_i\right)^2 = \mathbb{E}[w^2] - \mu^2. \qquad (T)$$

These summations can be restricted to $i \neq 0$, given that $s_0 = 0$. In order to avoid a loss of significance (and possibly avoid a negative result), some embodiments compute the weight variance as $$\sigma^2 = \sum_{i \in S} q_i (s_i - \mu)^2. \qquad (U)$$

Some embodiments perform forward propagation using the weight means and variances, as described in more detail below, but directly adjust the natural parameters (which correspond to adjustments to the weight means and variances as described above). As such, the derivatives of the weight mean and variance with respect to the natural parameters are required for backpropagation:

$$\frac{\partial \mu}{\partial \eta_i} = \sum_{j \in S} s_j \frac{\partial^2 A(\eta)}{\partial \eta_i \partial \eta_j} \qquad (V)$$
$$= \sum_{j \in S} s_j \mathrm{Cov}[x_i, x_j]$$
$$= q_i (s_i - \mu),$$

$$\frac{\partial \sigma^2}{\partial \eta_i} = \sum_{j,k \in S} s_j s_k \frac{\partial^3 A(\eta)}{\partial \eta_i \partial \eta_j \partial \eta_k} \qquad (W)$$
$$= \sum_{j,k \in S} s_j s_k \mathrm{Coskew}[x_i, x_j, x_k]$$
$$= q_i \left[ (s_i - \mu)^2 - \sigma^2 \right].$$

Some embodiments also vary the spectrum of possible weight values and/or the scaling factor $\alpha$ (in addition to the probability distribution for the weights and/or natural parameters) during training in order to minimize the loss function. For this purpose, the derivatives of the mean and variance with respect to the weight spectrum values are as follows:

$$\frac{\partial \mu}{\partial s_i} = q_i \qquad (X)$$

$$\frac{\partial \sigma^2}{\partial s_i} = 2q_i(s_i - \mu). \qquad (Y)$$

The derivatives of the mean and variance with respect to the scaling factor are:

$$\frac{\partial \mu}{\partial \alpha} = \frac{\mu}{\alpha}, \qquad (Z)$$

$$\frac{\partial \sigma^2}{\partial \alpha} = \frac{2\sigma^2}{\alpha}. \qquad (AA)$$

4. Kullback-Leibler Divergence

Kullback-Leibler (KL) divergence is a measure of how much one probability distribution diverges from a second (expected) probability distribution and is also referred to as the relative entropy. Some embodiments use the KL divergence within the loss function as a constraint that forces sparsity (i.e., having more of the weight values set to 0) in the network. In this case, the KL divergence is used to compute the divergence of the prior distribution (p) from the posterior distribution (q). This divergence is calculated as follows:

$$\begin{aligned} D_{KL}(q\|p) &= D_{KL}(\eta\|\eta') \\ &= (\eta - \eta')^T \mathbb{E}[T(x)] - A(\eta) + A(\eta') \\ &= \sum_{\substack{i \in S \\ i \neq 0}} (\eta_i - \eta_i')q_i - A(\eta) + A(\eta'). \end{aligned} \qquad (BB)$$

In Equation (BB), $\{\eta'_i = \ln(p_i/p_0): i \in S\}$, are the natural parameters for the prior distribution.

For backpropagation of the loss function, the derivatives of the KL divergence with respect to the natural parameters of the prior and posterior distributions are calculated as follows:

$$\frac{\partial D_{KL}(q\|p)}{\partial \eta_i} = q_i \big[(\eta_i - \eta_i')(\eta - \eta')^T q\big], \qquad (CC)$$

$$\frac{\partial D_{KL}(q\|p)}{\partial \eta_i} = p_i - q_i. \qquad (DD)$$

C. Variational Bayes Inference

In some embodiments, VBI is used to maximize the variational lower bound on the "marginal likelihood of the data". This function is given by $$\mathcal{L}(q) = L_{\mathcal{D}}(q) - D_{KL}(q\|p) \qquad (EE)$$

In this equation (EE), $L_{\mathcal{D}}(q)$ is the log-likelihood of the data, the negative of which provides a measure of the network error. This log-likelihood is given by the equation $$L_{\mathcal{D}}(q) = \sum_{n=1}^{N} \mathbb{E}[\ln p(y_n|x_n, w)]. \qquad (FF)$$

In Equation (FF), the sum is over all items n in the training batch, with item n having input $x_n$ and ground truth $y_n$. The expectation is over the posterior probability distribution q for all the weights. Because the goal is to minimize (rather than maximize) a loss function, $-\mathcal{L}(q)$ is used as the loss function l:

$$l = -\mathcal{L}(q) = L_{\mathcal{D}}(q) + D_{KL}(q\|p) \qquad (GG)$$

Thus, in addition to the usual negative log-likelihood term, the loss function includes a regularization term (the KL divergence) that penalizes the divergence of the prior probability distribution from the posterior probability distribution. In some embodiments, the KL term is phased in through training, so as to allow the network can achieve better accuracy initially and not be as constrained by the prior distribution.

The KL divergence term provides the loss function with a principled approach to regularization (there is no human-tuned coefficient in the regularization term), which ties the process into the minimum description length principle. The minimum description length principle, generally, holds that the best solution is that which permits the best compression of data. In this case, the goal is to minimize the overall use of error bits (represented by the negative log-likelihood) and model fit bits (represented by the KL divergence).

Some embodiments use additional terms in the loss function as well. For instance, some embodiments add the total entropy of all of the weights. At the end of training, this entropy should be zero, as all of the weights will have exactly one state (i.e., for any particular weight, the probability of one of the possible weight values will be 1 and the probability of all the other possible weight values will be 0). Some embodiments use an augmented Lagrangian term to enforce this as a global constraint (i.e., requiring the entropy of the overall posterior probability distributions to be zero). An example of such a term is $$\mathcal{L} = \mu E + \frac{c}{2} E^2,$$

where µ is a Lagrange multiplier and E represents the total entropy. As described for stochastic quantization techniques in U.S. patent Ser. No. 15/815,222, which is incorporated herein by reference, such a term can be increased throughout training to slowly force the weights towards an optimal value.

III. Network Training Process

Figure 4:
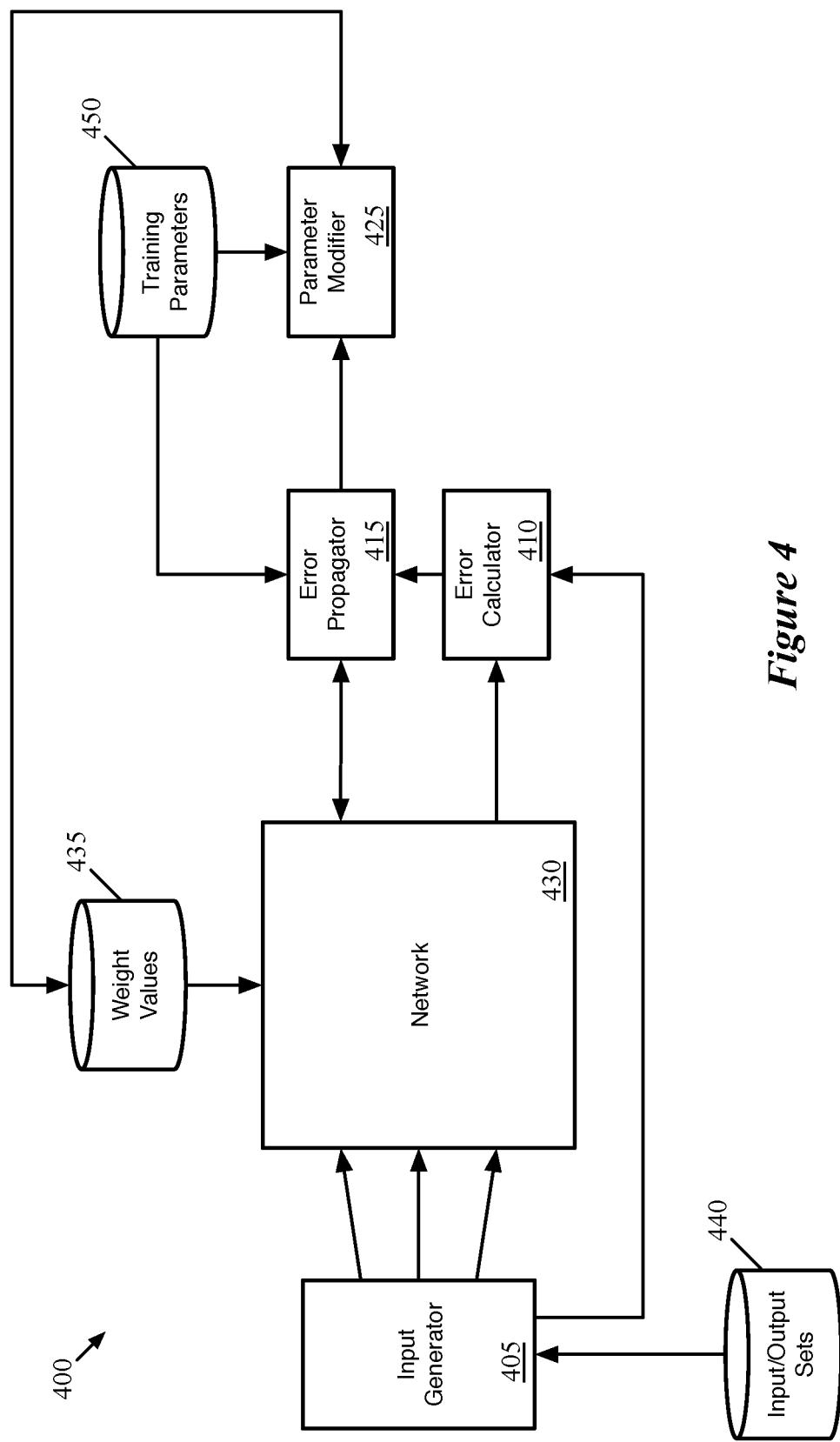
FIG. 4 conceptually illustrates a training system of some embodiments that balances network output error against sparsity of non-zero weight values in the loss function.

FIG. 4 conceptually illustrates a training system 400 of some embodiments that balances network output error against sparsity of non-zero weight values in the loss function. The training system 400 uses a set of discrete weight value candidates (which may be the same for all nodes in a network being trained, different for each layer of nodes, or different for each node in the network) to define a prior probability distribution for each weight, which is then used in the computation of the loss function. The resulting weight values, which in the optimal case are primarily the value 0, are used for the multi-layer network when embedded in a device to perform a particular function.

As shown, the system 400 includes an input generator 405, an error calculator 410, an error propagator 415, and a weight modifier 425. In some embodiments, all of these modules execute on a single device, such as a server, desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power. In some embodiments, at least some of the operations are executed by one or more graphics processing units (GPUs) of such a computing device (or devices).

Figure 5:
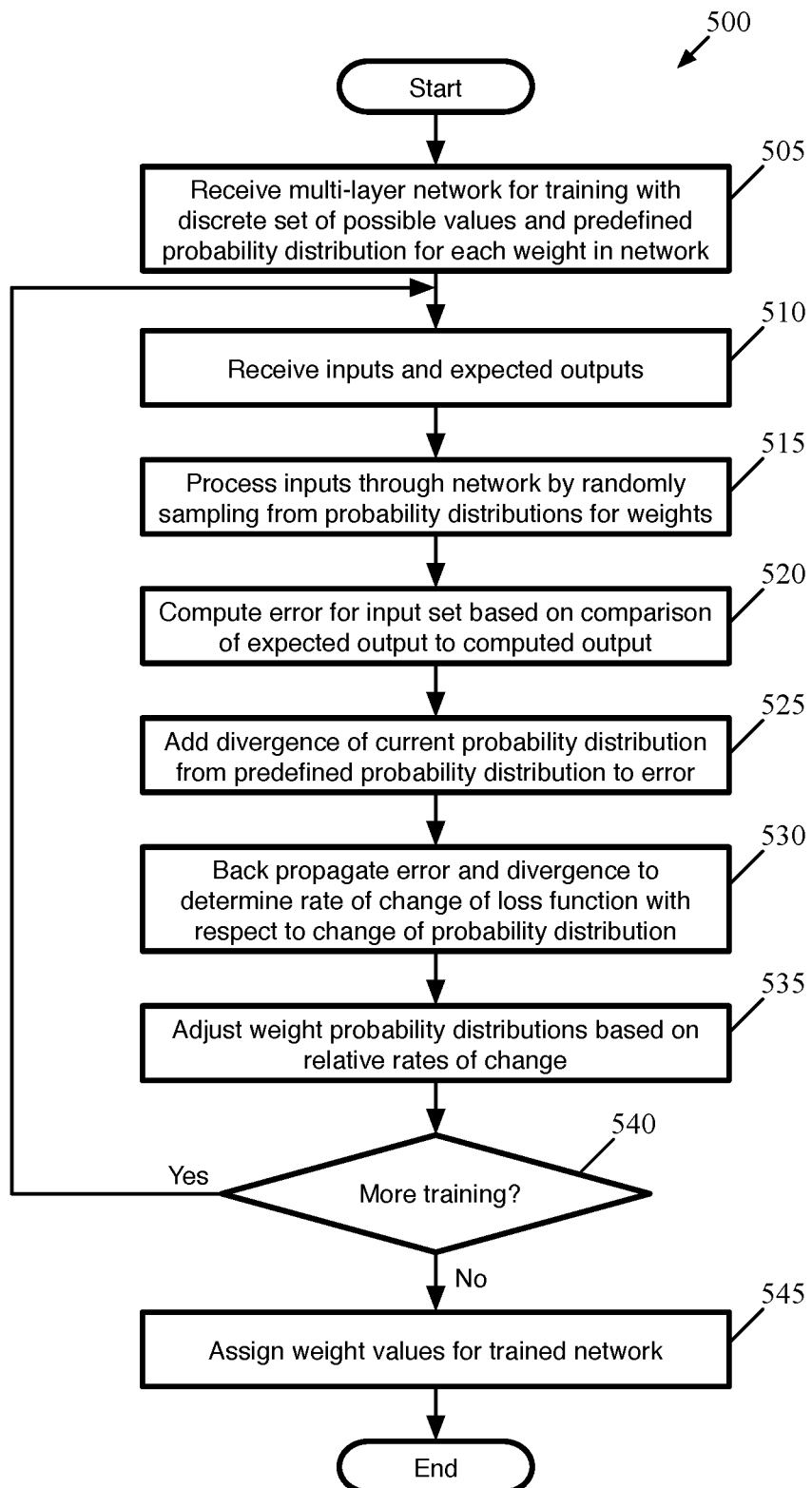
FIG. 5 conceptually illustrates a process of some embodiments for training a multi-layer machine-trained network.

FIG. 5 conceptually illustrates a process 500 of some embodiments for training a multi-layer machine-trained network. This process 500 will be described in part by reference to the training system 400. As shown, the process begins by receiving (at 505) a multi-layer network for training, with discrete sets of possible weight values and predefined probability distributions for each weight in the network. The process 500 also receives (at 510) a set of inputs and an expected output for each of the inputs. Depending on the purpose of the network and the type of inputs, these expected outputs may be values in multi-dimensional space, classifications (e.g., for images), etc.

The network 430 of some embodiments is a multi-layer machine-trained network (e.g., a feed-forward neural network), such as that shown in FIG. 1. This network 430 includes multiple layers of nodes, including a layer of input nodes, at least one layer of hidden nodes, and a layer of output nodes. Each of at least a subset of the hidden nodes and output nodes includes a linear component (that uses the weight values 435) and a non-linear activation function. The network receives an input and computes a corresponding output.

The weight values are used to parameterize the network and are trained by the system 400 for the network to perform a particular task. As discussed above, in some embodiments the weights are represented by categorical probability distributions between a discrete set of possible weight values (e.g., 0, 1, −1), and the weights are assigned initial predefined probability distributions, which are modified during the course of training. In addition, some embodiments also store the natural parameters of the distribution with the weight values.

For the inputs, some embodiments perform training with a large number of different inputs, as this can help train the weight values for an average input. Each input in an input set may be an image, a voice snippet, etc. that is to be propagated through the network, depending on the specific purpose for which the network is being trained. For example, if a network is being trained to identify faces, the set of inputs will include numerous images of several different people's faces, probably including various types of edge cases (e.g., images where the face is distorted, where objects partially appear in front of the face, etc.). Each input also has a corresponding expected (ground truth) output that is what the network should generate as its output when presented with that input.

The input generator 405 selects a set of inputs (and corresponding expected outputs) from the sets of inputs and outputs 440. In addition, in some embodiments, the input generator 405 breaks up the inputs into constituent values to be fed into the input layer of the network 430. For instance, for a network being trained to recognize objects in images or to differentiate faces, the input generator might simply divide the pixels into several sections, or might perform computations based on the pixel values and feed these to the input layer (e.g., the percentage of red pixels in the image, the average red value of each pixel, or other statistics). That is, based on the input (e.g., an image), the input generator 405 might perform a set of computations in order to generate the inputs for the input layer of the network 430.

Next, the network 430 processes (at 515) the set of inputs through the network to obtain computed outputs (i.e., outputs predicted according to the current state of the network 430, using the current weight spectra and probability distributions). Each input propagates through the processing nodes of the network 430, with each layer of nodes receiving their one or more inputs and generating an output to pass to the next layer of nodes. In the final output layer, one or more nodes receives the outputs from the previous layer and generates the outputs of the network. In some embodiments, this processing entails, for each node, the linear component first computing a weighted sum of its input values, and then the non-linear activation function computing an output based on this weighted sum.

Some embodiments compute the linear component by randomly sampling from the probability distributions from the weights. Rather than directly sampling from the probability distribution for each weight for each of the inputs, some embodiments calculate the mean and variance for each weight (using, e.g., Equations (S) and (U) above) and use these along with the node input values to compute an output mean and variance for each node. Once the output mean and variance are calculated, the network 430 randomly samples from the output distribution (e.g., assuming a normal distribution) in some embodiments. This process is described in greater detail below and has the benefit of using a single mean and variance for each weight value rather than randomly sampling each weight value for each different network input during a training iteration (thereby providing an efficiency benefit to the processor performing the calculations). Other embodiments propagate the mean and variance through the network rather than randomly sampling, which is also described in detail below.

The process 500 then computes (at 520) the error for the input set based on a comparison of the expected outputs to the computed outputs. In some embodiments, the error calculator 410 computes the error for each individual input as the network 430 generates its output, while in other embodiments the error is computed after all of the outputs are generated (e.g., in cases for which the error is calculated based on comparison of different outputs to each other as well). The error calculator 410 of some embodiments receives both the predicted output from the input generator 405 and the output of the network 430 and uses a loss function that quantifies the difference between the predicted output and the actual output for each input. Some embodiments compute this as a simple difference, or absolute value of the difference, between the two values; other embodiments compute the square of the differences, or other such measure. In addition, some embodiments sum or average the loss function value for each input in a set of inputs.

The process 500 (e.g., the error calculator 410) also adds (at 525) the divergence of the current (posterior) probability distribution from the predefined (prior) probability distribution to the error, as a constraint on the weight parameters (i.e., to constrain the number of non-zero weights). As described in the previous section, some embodiments use the KL divergence for this term of the loss function. This calculated loss function value (i.e., the value computed by equation GG) is passed to the error propagator 315 in some embodiments.

With the loss function calculated, the process 500 (e.g., the error propagator 415) backpropagates (at 530) the error and divergence to determine the rate of change of the loss function with respect to the change of the probability distribution. Specifically, some embodiments first determine the derivative of the negative log-likelihood loss (i.e., the $L_D(q)$ term in Equation (GG)), then use the chain rule to compute the derivative o the negative log-likelihood loss term with respect to the natural parameters and the weight spectrum values for each weight. The derivative of the KL divergence with respect to the posterior and prior natural parameters is then added to the derivative of the KL divergence. Additional details of the negative log-likelihood derivatives are provided below.

Next, the process 500 (e.g., the parameter modifier 425) adjusts the probability distributions based on the relative rates of change identified by the error propagator. The error propagator 415 provides, for each natural parameter $\eta_i$ of the posterior distribution for each weight value, the partial derivative of the total loss function with respect to that parameter. These partial derivatives are used to update the natural parameters by moving the parameters in the direction opposite the gradient (to attempt to reduce the loss function value) by a particular amount, with a larger partial derivative for a particular parameter resulting in a greater change to the parameter. The parameter modifier 425 uses a training rate factor from the training parameters 450 to determine how much to adjust the parameters based on the instantaneous gradient components. In some embodiments, the natural parameter adjustments correspond to adjustments to the probability distribution among the spectrum of possible weight values for the weight according to, e.g., Equation (N).

Some embodiments also adjust the weight spectrum values for each layer using the computed gradients. Furthermore, some embodiments adjust the prior distribution natural parameters for each layer, while other embodiments keep the prior distribution constant throughout the training process.

After updating the weights, the process 500 determines (at 540) whether to perform more training. Some embodiments use a minimization process to determine when to stop training the network. In some embodiments, the system 400 only stops training the network once (i) a large enough percentage of the weight values have been set to zero, (ii) a large enough percentage of the probability distributions have collapsed so that all of the weights have definite assignments to one of their possible weight values, and (iii) the probability distributions have changed by less than a threshold for a particular number of training iterations. Other embodiments may have other conditions for completing training. In some embodiments, the input generator 405 determines whether to perform more training, while in other embodiments, a different module (e.g., a module not shown in FIG. 4) makes this determination.

If additional training is required, the process returns to 510 to perform another iteration of training with another set of inputs. Some embodiments use the same set of inputs for each training iteration, while other embodiments use different inputs each iteration. If training is complete, the process assigns (at 545) the weight values for the trained network (i.e., converts the probability distributions for the weights to actual weight values), and stores these values for enabling the network to perform its designated purpose. The process 500 then ends.

A. Randomly Sampling Outputs

As mentioned, during forward propagation of the inputs through the network some embodiments do not directly choose a weight value for each weight, but instead use the means and variances of the categorical distribution for the weight in order to compute the mean and variance for the output of the linear component of a node, then randomly sample this output.

Figure 6:
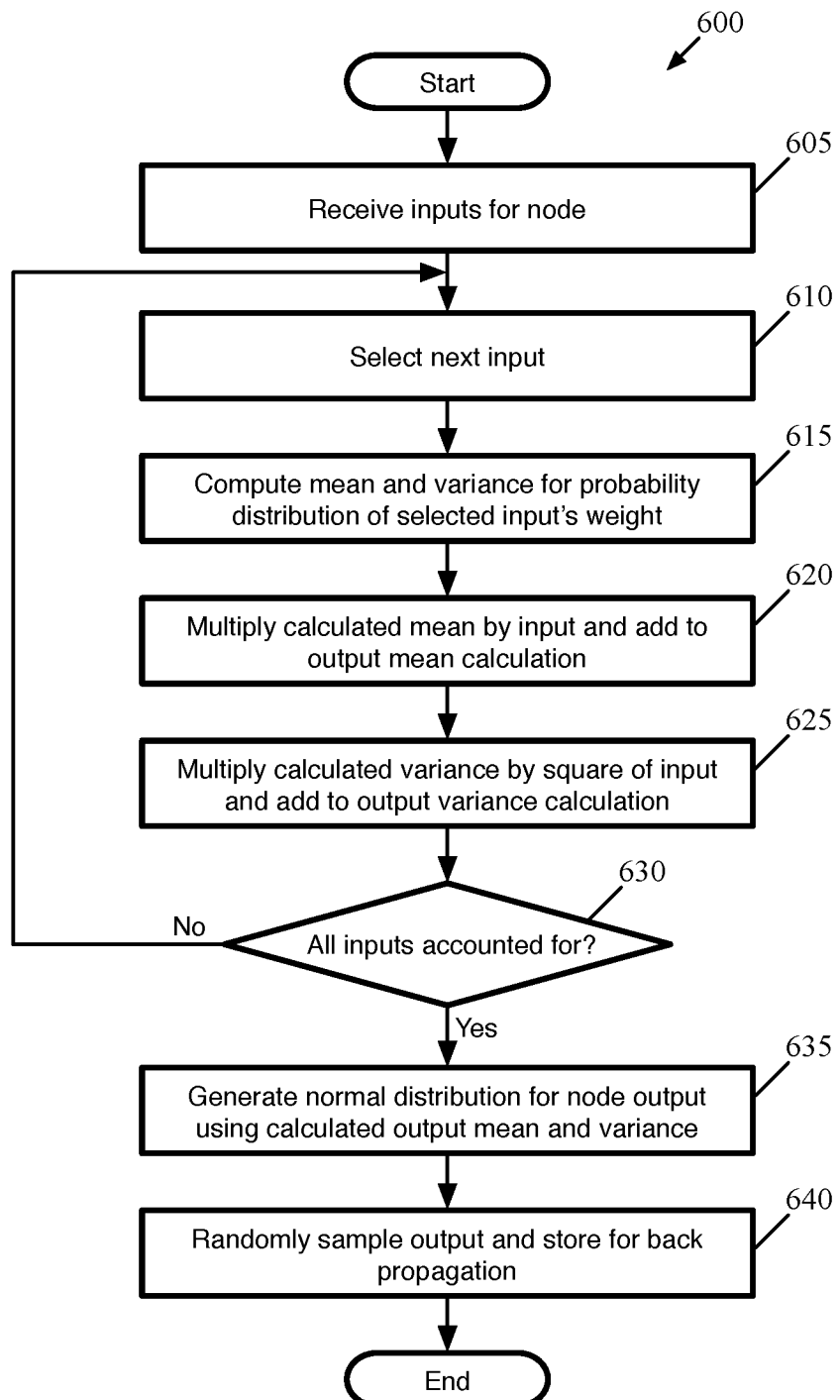
FIG. 6 conceptually illustrates a process of some embodiments for computing the output value of a node within a machine-trained network during the training process.
Figure 7:
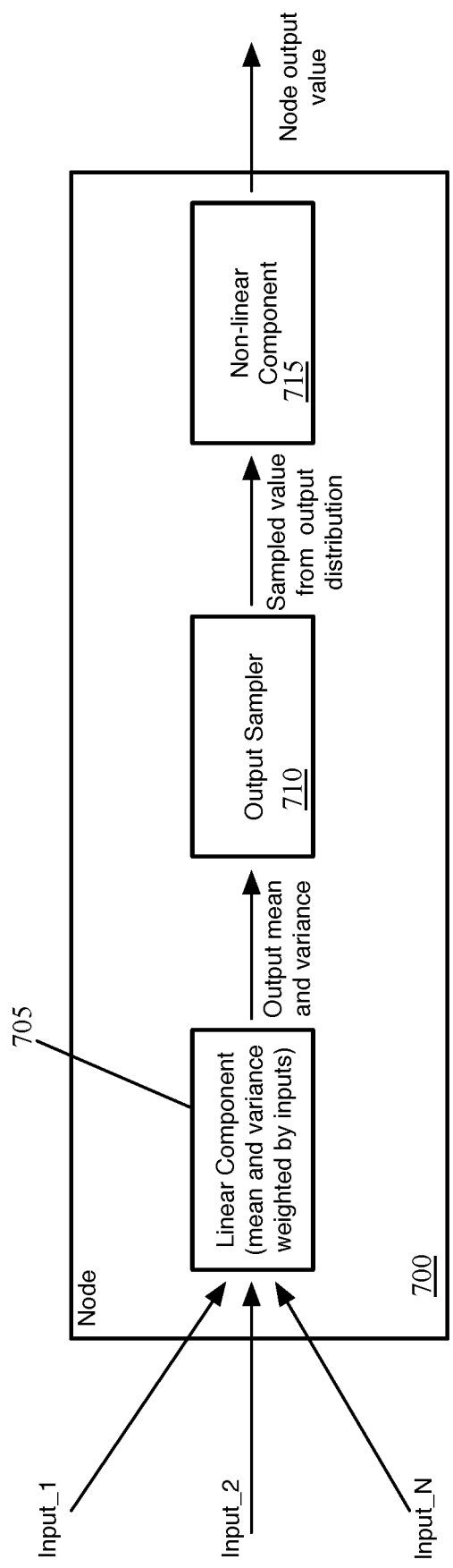
FIG. 7 conceptually illustrates the architecture of a node during training.

FIG. 6 conceptually illustrates a process 600 of some embodiments for computing the output value of a node within a machine-trained network during the training process by randomly sampling the output. The process 600 is performed by the network 430 of some embodiments and will be described in part by reference to FIG. 7. FIG. 7 conceptually illustrates the architecture of a node 700 during training. As described above, in a typical neural network, a node includes a linear component and a non-linear component. The node 700, however, includes a linear component 705, an output sampler 710, and a non-linear component 715.

As shown, the process 600 begins by receiving (at 605) inputs for the node. As in a typical neural network, for an interior or output layer node, these inputs may be the outputs from the nodes of the previous layer (which, in some embodiments, are also calculated in the same way as the present node, using the weight distribution means and variances). FIG. 7 illustrates the node 700 receiving N inputs (from the N nodes of the previous layer) for the linear component 705.

The process 600 then performs the dot products for the linear component. The process selects (at 610) a next input. It should be understood that while the process 600 illustrates the dot product performed serially, this is a conceptual process. Some embodiments perform the multiplications of the inputs with the weight means and variances in parallel using a matrix of weight means and variances, rather than serially as shown in this FIG. 6.

The process 600 computes (at 615) the mean and variance for the probability distribution of the selected input's weight. Though shown in this figure as an inline computation, some embodiments compute all of the categorical distribution weight means and variances before a training iteration. This enables the processor (e.g., the GPU) to store a matrix of these weight means and variances for each node and reuse this matrix for each input propagated through the network. These weight means and variances are calculated as shown in Equations (S) and (T), provided above.

Using these weight means and variances, the process 600 multiplies (at 620) the calculated mean by the input and adds this to a summed output mean calculation. Similarly, the process multiplies (at 625) the variance by the square of the input and adds this to a summed output variance calculation. The derivation of these formulas for the output mean and variance is provided by starting from the assumption that a layer computes an output matrix B by multiplying an input matrix A (with all of the inputs received from the previous layer) by a weight matrix W (i.e., B=AW). Given this, the formula for computing a particular output $b_{mj}$ is $$b_{mj} = \sum_{i \in I} a_{mi} w_{ij}. \tag{HH}$$

Under the assumption that the probability distributions for distinct weights are independent, then the mean for each output can be calculated as $$\mathbb{E}[b_{mj}] \equiv \gamma_{mj} = \sum_{i \in I} a_{mi} \mathbb{E}[w_{ij}] = \sum_{i \in I} a_{mi} \mu_{ij} \tag{II}$$

and the variance for each output calculated as $$\mathrm{Var}[b_{mj}] \equiv \delta_{mj} = \sum_{i \in I} a_{mi}^2 \mathrm{Var}[w_{ij}] = \sum_{i \in I} a_{mi}^2 \sigma_{mi}^2. \tag{JJ}$$

That is, the mean for an output is calculated as the sum of the products of each input multiplied by the mean for its corresponding weight, while the variance is calculated as the sum of the products of each squared input multiplied by the variance for its corresponding weight.

The process 600, which as mentioned is a conceptual process, determines (at 630) whether all of the inputs to the node are accounted for. If additional inputs require processing, the process returns to 610 to select the next input. FIG. 7 illustrates that the linear component output of the node 705 is not a single value, but rather an output mean and variance, which is provided to the output sampler 710.

Once all inputs are accounted for (and the output means and variances are computed), then the process 600 generates (at 635) a normal distribution for the node output using the calculated output mean and variance. Although the weight probability distributions are not normal (Gaussian) distributions, the central limit theorem implies (so long as the separate distributions are independent) that the output distribution can be treated as a normal distribution (assuming that there are a large number of weights per node, which is the case for a typical neural network.

The process then randomly samples (at 640) the output and stores this value for backpropagation. The randomly sampled value is used as the output of the linear component of the node. Some embodiments select a "z-score" $\xi_{mj}$ from a zero-mean univariate normal distribution and use this to compute the output value. The output value, is therefore provided by $$b_{mj} = \gamma_{mj} + \sqrt{\delta_{mj}} \xi_{mj}, \quad \text{(KK)}$$

which isolates the randomness from the model parameters. The z-score is stored in some such embodiments for use in backpropagation, and because the randomness is isolated, the gradient computed during backpropagation does not depend on this randomness.

Randomly sampling after computation of the output means and variances rather than sampling each weight value prior to the output computation allows the processor to use of a single matrix of weight means and variances across an entire iteration of inputs, as mentioned above. Sampling each weight value prior to the dot product computation would require either the selection of the same random choice for all inputs in a training iteration (not ideal for training purposes) or a new random selection for each input (not computationally efficient for the processor). The random sampling of the output distribution is a computationally efficient technique that provides the training benefit of randomly sampling each weight for each input.

As shown in FIG. 7, the mean and variance output of the linear component is input to an output sampler 710, which selects the z-score value for the node and outputs a single sampled output value. This value is then provided to the non-linear component 715 for the node, which may be any of the above-mentioned types of activation function. The non-linear component 715 generates the actual node output value that is provided to the next layer of the network.

For backpropagation, several derivatives are computed, owing to the different terms in the loss function and the different parameterizations of these terms. The derivatives of the negative log-likelihood term with respect to the layer outputs is computed as per normal techniques. Given these, the derivatives with respect to the layer inputs as well as the weight means and variances can be computed.

The derivatives of the node output variances with respect to each of the weight variances are provided by $$\frac{\partial \delta_{mj}}{\partial \sigma_{ij}^2} = a_{mi}^2. \quad \text{(LL)}$$

The derivatives of the node outputs with respect to their weight means are provided by $$\frac{\partial b_{mj}}{\partial \mu_{ij}} = a_{mi}, \quad \text{(MM)}$$

while the derivatives of the node outputs with respect to the weight variances are provided by $$\frac{\partial b_{mj}}{\partial \sigma_{ij}^2} = \frac{\partial b_{mj}}{\partial \delta_{mj}} \frac{\partial \delta_{mj}}{\partial \sigma_{ij}^2} = \frac{\zeta_{mj} a_{mi}^2}{2\sqrt{\delta_{mj}}}. \quad \text{(NN)}$$

In addition, the derivatives of the node outputs with respect to the node output variances are provided by $$\frac{\partial b_{mj}}{\partial \delta_{mj}} = \frac{\zeta_{mj}}{2\sqrt{\delta_{mj}}}, \quad \text{(OO)}$$

and the derivatives of the node outputs with respect to the node inputs are provided by $$\frac{\partial b_{mj}}{\partial a_{mi}} = \mu_{ij} + \frac{\zeta_{mi} a_{mi} \sigma_{ij}^2}{\sqrt{\delta_{mj}}}. \quad \text{(PP)}$$

Lastly, the derivatives of the negative log-likelihood with respect to any of the inputs, weight means, or weight variances, are provided by $$\frac{\partial(-L_D(q))}{\partial \xi} = \frac{\partial(-L_D(q))}{\partial b_{mj}} \frac{\partial b_{mj}}{\partial \xi}, \text{ for } \xi \text{ any of } a_{mi}, \mu_{ij}, \text{ or } \sigma_{ij}^2. \quad \text{(QQ)}$$

Some or all of these derivatives may be used during backpropagation in order to compute the gradients and update the natural parameters of the weight distributions as well as, in some embodiments, the weight spectrum values and/or the prior distribution natural parameters.

It should be noted that the description that follows assumes that the weights are not correlated (that is, that the probability distribution for one weight does not affect the probability distribution for any of the other weights). However, some embodiments do include such dependencies. For instance, image analysis networks are often convolutional neural networks that have weights organized into filters (e.g., 3×3×3 filters, that each have 27 weight values). In the case of such networks, some embodiments also include a probability whether the filter is used at all. If the filter is not used, then all weights are zero. On the other hand, if the filter is used, then the probability model discussed above applies. Furthermore, when a filter is not used (i.e., all weights are zero), this has the additional effect of providing inputs equal to zero to later nodes, and so the weights corresponding to those inputs are not meaningful.

B. Propagating Output Distributions

As mentioned above, some embodiments do not randomly sample the output at each node, and instead propagate the mean and variance (or other information about the output distributions) forward through the network. As is typical for such networks, the output value of a convolution or inner-product layer is computed as the dot product $$b_{mj} = \sum_{i \in I} a_{mi} w_{ij}, \quad \text{(RR)}$$

where $a_{mi}$ are the inputs, $w_{ij}$ are the weights, and $b_{mj}$ are the outputs. When the dot product includes a large number of terms (as is typical) and the terms are uncorrelated, then the Central Limit Theorem provides that the value of the dot product can be well-approximated by a normal distribution, which enables the random sampling techniques discussed above. Under the further assumption that the random variables (weights and inputs) are uncorrelated, then the mean of the dot product is given by $$\mathbb{E}[b_{mj}] = \sum_{i \in I} \mathbb{E}[a_{mi}]\mathbb{E}[w_{ij}] \quad \text{(SS)}$$

and the variance by $$\text{Var}[b_{mj}] = \sum_{i \in I} \{\text{Var}[a_{mi}]\text{Var}[w_{ij}] + \mathbb{E}[a_{mi}]^2 \text{Var}[w_{ij}] + \text{Var}[a_{mi}]\mathbb{E}[w_{ij}]^2\}. \quad \text{(TT)}$$

Thus, to compute the mean and variance of the dot product output the mean and variance of the weights and layer inputs are required. Equations (S) and (T) described above in Section II.B.3 provide the weight mean and variance, respectively. For the layer input, if that input comes directly from a data layer (e.g., an input layer), then the variance is either zero or a constant determined by the precision of the data (e.g., RGB quantization). The mean and variance of a downstream input are determined based on how the mean and variance of a dot product are transformed by passing the normal distribution of dot-product values through a nonlinear activation function (e.g., a ReLU, leaky ReLU, etc.). This is described below with respect to quantized activation values and the ReLU activation function.

Performing these calculations allows the effects of weight uncertainty to be propagated forward through the network from the primary inputs to the final network outputs. In this case, the uncertainty in the output of a layer is due not only to the uncertainty in the weights of that layer but also due to the uncertainty from all the previous layers, which gives an accurate measure of the uncertainty in output values due to an overall weight uncertainty. Furthermore, the propagation of distributions rather than sampling output values reduces the variance of the estimated gradient, which on the whole leads to improved solution quality. In addition, in the case that output values are quantized, propagating distributions allows for the network to compute a continuous function of the network parameters, avoiding discontinuities and infinite gradients that would appear under the assumption that the dot products are known with infinite precision.

1. Value Quantization

In some embodiments, the network quantizes activation output values as well as weights. Value quantization appears to make the function computed by a node discontinuous, yielding a gradient that is the sum of Dirac and delta functions. However, the discontinuities occur only in the limit where the network computes values with infinite precision, which is not the case when using an approximate probabilistic knowledge of the weights.

After passing the distribution for a dot product with mean $\mu_{dp}$ (given by Equation (SS)) and variance $\sigma^2_{dp}$ (given by Equation (TT)) through a quantization layer having a quantized value spectrum $$v_0 < v_1 < \ldots < v_{n-1} \quad \text{(UU)}$$

the result is a categorical distribution given by:

$$P(v_i) \begin{cases} CDF_{dp}(v_{i+1}), & i = 0 \\ CDF_{dp}(v_{i+1}) - CDF_{dp}(v_i), & 0 < i < n_v - 1 \\ 1 - CDF_{dp}(v_i), & i = n_v - 1 \end{cases} \quad \text{(VV)}$$

Here CDF is the cumulative distribution function for $(\mu_{dp}, \sigma_{dp}^2)$:

$$CDF_{dp}(x) = \phi((x-\mu_{dp})/\sigma_{dp}), \quad \text{(WW)}$$

where $\Phi$ is the cumulative distribution function for the standard normal distribution. While the quantized values are discrete, the probability of a quantized value $P(v_i)$ is a continuous function of the network parameters (e.g., of the natural parameters of the posterior distributions for the weights). Application of the activation function to this categorical distribution relabels the components of the categorical distribution but does not change the probabilities of the components.

When the categorical distribution for a quantized dot product is passed through an activation function $f(x)$, the result is another categorical distribution with mean $$\mu_{act} = \sum_{0 \le i < n_v} P(v_i) f(v_i) \quad \text{(XX)}$$

and variance $$\sigma^2_{act} = \sum_{0 \le i < n_v} P(v_i)[f(v_i) - \mu_{act}]^2 \quad \text{(YY)}$$

With the mean and variance of each quantized activation function computed, the mean and variance for any dot product in the downstream layer can be computed using Equations (SS) and (TT). The computation time for computing the mean and variance of the quantized activation function (given the mean and variance of a dot product) is linear in the number of quantized values. This can be reduced to constant time by pretabulating $\mu_{act}$ and $\sigma^2_{act}$ as functions of $\mu_{dp}$ and $\sigma^2_{dp}$. The 2×2 Jacobian matrix of this transformation can also be used in backpropagation.

2. ReLU Activation Function

In many networks, the activation function outputs are not quantized. In this case, the effect of the nonlinear activation function on the dot product output mean and variance is computed. For a ReLU function ($f(x) = \max(0, x)$), these can be computed analytically. For a dot-product output $y_{dp} \sim (\mu_{dp}, \sigma_{dp}^2)$, applying a ReLU activation function results in a mean of $$\mathbb{E}[\text{ReLU}(Y_{dp})] = \mu_{dp}[-\phi(z_0)] + \sigma_{dp}\phi(z_0) \quad \text{(ZZ)}$$

where $\phi(x)$ is the standard normal probability density function $$\phi(x) = \frac{1}{\sqrt{2\pi}} e^{-x^2/2} \quad \text{(AAA)}$$

and $$z_0 = \frac{-\mu_{dp}}{\sigma_{dp}}$$

is the z-score corresponding to $y_{dp}=0$, where the ReLU "turns on". This expectation tends to 0 when $\mu_{dp} \ll \sigma_{dp}$ and tends to $\mu_{dp}$ when $\mu_{dp} \gg \sigma_{dp}$. The variance of the ReLU output is $$\text{Var}[\text{ReLU}(Y_{dp})] = [\sigma_{dp}^2 + \mu_{dp}^2 \phi(z_0)][1-\phi(z_0)] + \mu_{dp}\sigma_{dp}[2\phi(z_0)-1]\phi(z_0) - \sigma_{dp}^2\phi(z_0)^2 \quad \text{(BBB)}$$

which tends to 0 when $\mu_{dp} \ll \sigma_{dp}$ and tends to $\mu_{dp}$ when $\mu_{dp} \gg \sigma_{dp}$. While for the ReLU the mean and variance can be computed analytically, for some activation functions this is not the case. For such other activation functions, some embodiments pre-tabulate these quantities and their derivatives, as in the case of quantized activation outputs.

IV. Device with Machine-Trained Network

Figure 8:
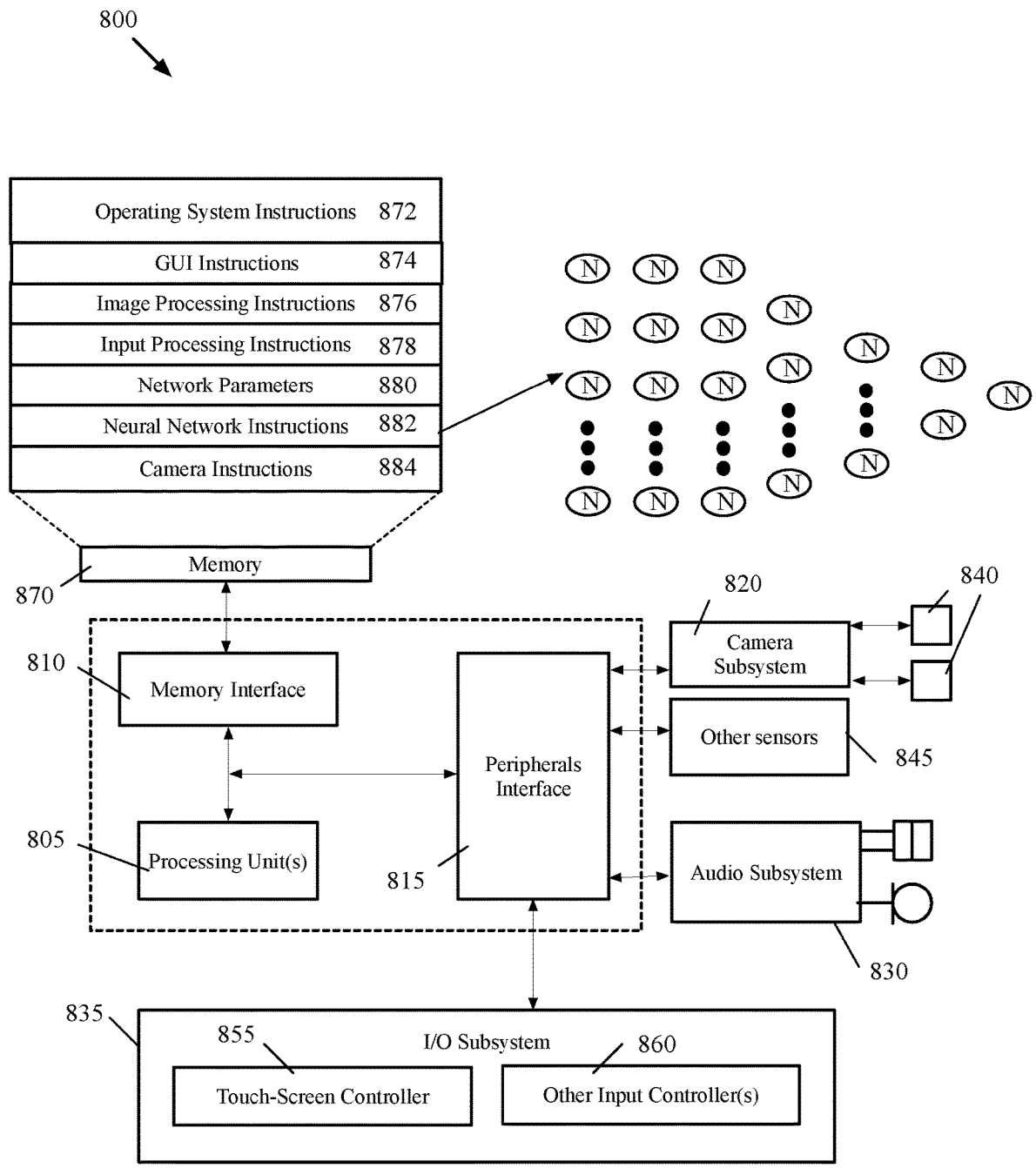
FIG. 8 illustrates an example of the architecture of a mobile computing device that stores neural network processing instructions.

Once an image analysis network (e.g., for face recognition, object categorization, other image analysis, voice recognition, etc.) is trained, the network can be embedded into devices (e.g., to perform face identification, etc.) such as mobile devices, desktop computers, Internet of Things (IoT devices), etc. FIG. 8 is an example of an architecture 800 of a mobile computing device that stores neural network processing instructions, with at least one set of weight parameters for the network. Examples of mobile computing devices include smartphones, tablets, laptops, etc. As shown, the mobile computing device 800 includes one or more processing units 805, a memory interface 810 and a peripherals interface 815. While a mobile device is shown in this example, many of these principles apply to other types of devices that use neural networks. An IOT device, for instance, might have fewer subsystems and fewer types of stored instructions, to perform its specific purpose and have the ability to receive a single type of input that is evaluated with its neural network.

The peripherals interface 815 is coupled to various sensors and subsystems, including a camera subsystem 820, an audio subsystem 830, an I/O subsystem 835, and other sensors 845 (e.g., motion sensors), etc. The peripherals interface 815 enables communication between the processing units 805 and various peripherals. For example, an orientation sensor (e.g., a gyroscope) and an acceleration sensor (e.g., an accelerometer) can be coupled to the peripherals interface 815 to facilitate orientation and acceleration functions. The camera subsystem 820 is coupled to one or more optical sensors 840 (e.g., a charged coupled device (CCD) optical sensor, a complementary metal-oxide-semiconductor (CMOS) optical sensor, etc.). The camera subsystem 820 and the optical sensors 840 facilitate camera functions, such as image and/or video data capturing.

The audio subsystem 830 couples with a speaker to output audio (e.g., to output voice navigation instructions). Additionally, the audio subsystem 830 is coupled to a microphone to facilitate voice-enabled functions, such as voice recognition (e.g., for searching), digital recording, etc. The I/O subsystem 835 involves the transfer between input/output peripheral devices, such as a display, a touch screen, etc., and the data bus of the processing units 805 through the peripherals interface 815. The I/O subsystem 835 includes a touch-screen controller 855 and other input controllers 860 to facilitate the transfer between input/output peripheral devices and the data bus of the processing units 805. The touch-screen controller couples with a touch screen (not shown) to detect contact and movement on the touch screen using any of multiple touch sensitivity technologies. The other input controllers 860 are coupled to other input/control devices, such as one or more buttons.

In some embodiments, the device includes wireless communication subsystem (not shown in FIG. 8) to establish wireless communication functions. In some embodiments, the wireless communication subsystem includes radio frequency receivers and transmitters, and/or optical receivers and transmitters. These receivers and transmitters of some embodiments are implemented to operate over one or more communication networks such as a GSM network, a Wi-Fi network, a Bluetooth network, etc.

The memory interface 810 is coupled to memory 870. As illustrated in FIG. 8, the memory 870 stores an operating system (OS) 872. The OS 872 includes instructions for handling basic system services and for performing hardware dependent tasks. The memory 870 also stores various sets of instructions, including (1) graphical user interface instructions 874 to facilitate graphic user interface processing; (2) image processing instructions 876 to facilitate image-related processing and functions; (3) input processing instructions 878 to facilitate input-related (e.g., touch input) processes and functions; and (4) camera instructions 884 to facilitate camera-related processes and functions. The processing units 810 execute the instructions stored in the memory 870 in some embodiments.

In addition, the memory 870 stores neural network instructions 882, for implementing a machine-trained network of some embodiments of the invention. The memory also stores at least one set of network parameters 880 (i.e., weight values for enabling the network to perform a specific purpose). These network parameters 880 may include multiple sets of weight values in some embodiments (e.g., a set of weight values for an audio-processing network and a set of weight values for an image-processing network). These sets of weights are used by the processing units 810 when executing the neural network instructions 882 to perform a specific purpose (e.g., audio processing, image processing, face recognition, etc.).

The memory 870 further stores communication instructions to facilitate communicating with one or more additional devices. The instructions described above are merely exemplary and the memory 870 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

The memory 870 may represent multiple different storages available on the device 800. In some embodiments, the memory 870 includes volatile memory (e.g., high-speed random access memory), non-volatile memory (e.g., flash memory), a combination of volatile and non-volatile memory, and/or any other type of memory. In some embodiments, the memory 870 includes processor registers, multiple levels of processor caches (e.g., the L0 micro-operations cache, L1 instruction cache, L1 data cache, etc.), main memory (e.g., RAM), disk storage, etc. In some embodiments, when possible, one or more sets of weight parameters 880 are stored in one of the levels of processor caches, so that the data is quickly accessible and does not need to be loaded onto the processor to evaluate an input.

While the components illustrated in FIG. 8 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 8 may be split into two or more integrated circuits.

V. Electronic System

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
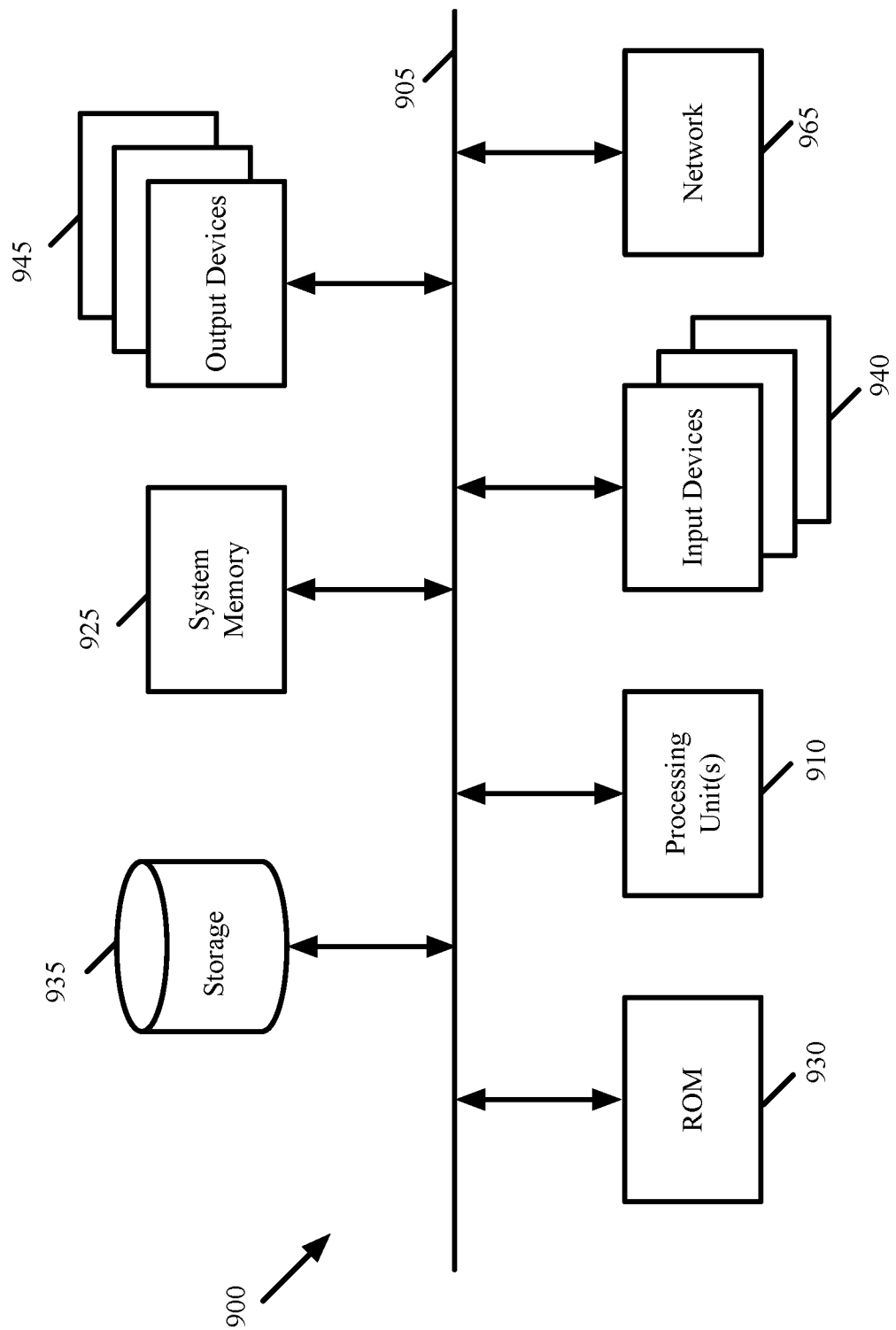
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments, and may include generic CPUs as well as graphics processing units (GPUs).

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 5 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for training a neural network comprising a plurality of nodes that use a plurality of weights, wherein each node of a set of the nodes produces a node output value by computing a dot product of weight values for the node and input values for the node that are node output values of previous nodes, the method comprising:
    propagating a plurality of inputs through the neural network to generate an output for each of the inputs, wherein each weight of a set of the weights is defined as a probability distribution across a set of allowable values for the weight, wherein for each weight, the set of allowable values for the weight comprises the value zero, a positive value for the weight, and a negation of the positive value for the weight, wherein propagating a particular input through the neural network comprises, for at least a particular node:
    computing a node output value probability distribution by computing (i) a mean node output value for the particular node based on a dot product of means of the weight values for the particular node and the input values for the particular node and (ii) a variance for the particular node based on variances of the weight values for the particular node and the input values for the particular node; and
    randomly sampling from the computed node output value probability distribution for the particular node to determine the node output value for the particular node; and
    using the outputs generated for the plurality of inputs to train the weights.

2. The method of claim 1, wherein the input values for the particular node are determined by randomly sampling from node output value probability distributions computed for a plurality of previous nodes.

3. The method of claim 1, wherein propagating the particular input through the neural network comprises, for each node of the set of the nodes:
    computing a node output value probability distribution by computing (i) a mean node output value for the node based on a dot product of means of the weight values for the node and and the input values for the node and (ii) a variance for the node based on variances of the weight values for the node and the input values for the node; and
    randomly sampling from the computed node output value probability distribution for the node to determine the node output value for the node.

4. The method of claim 3, wherein each of the inputs of the plurality of inputs is propagated through the neural network by computing node output value probability distributions for each node of the set of nodes and randomly sampling from the computed node output value probability distributions.

5. The method of claim 3 further comprising computing the means and variances of each of the weight values prior to propagating the plurality of inputs through the neural network.

6. The method of claim 1, wherein computing the variance for the particular node comprises:
    for each input value for the particular node, multiplying a square of the input value by the variance of a weight value corresponding to the input value to compute an intermediate variance value for the input value; and
    summing the intermediate variance values for the input values for the particular node.

7. The method of claim 1, wherein:
    each weight of the set of weights has a predefined probability distribution; and
    using the outputs generated for the plurality of inputs to train the weights comprises computing a value of a loss function comprising (i) a first term that measures error based on the generated outputs and (ii) a second term based on divergence of the probability distribution for each weight in the set of weights from the predefined probability distribution for the weight.

8. The method of claim 7, wherein using the outputs generated for the plurality of inputs to train the weights further comprises:
    backpropagating the calculated loss function value through the neural network to determine, for each of the weights of the set of weights, a rate of change in the calculated loss function value relative to a rate of change in the weight; and
    modifying the probability distribution for each weight in the set of weights based on the determined rate of change for the weight.

9. The method of claim 7, wherein for each weight of the set of weights, the second term increases as probability values for non-zero values of the set of allowable values for the weight increase.

10. A non-transitory machine-readable medium storing a program which when executed by at least one processing unit trains a neural network comprising a plurality of nodes that use a plurality of weights, wherein each node of a set of the nodes produces a node output value by computing a dot product of weight values for the node and input values for the node that are node output values of previous nodes, the program comprising sets of instructions for:
    propagating a plurality of inputs through the neural network to generate an output for each of the inputs, wherein each weight of a set of the weights is defined as a probability distribution across a set of allowable values for the weight, wherein for each weight, the set of allowable values for the weight comprises the value zero, a positive value for the weight, and a negation of the positive value for the weight, wherein the set of instructions for propagating a particular input through the neural network comprises, for at least a particular node, sets of instructions for:
  computing a node output value probability distribution by computing (i) a mean node output value for the particular node based on a dot product of means of the weight values for the particular node and the input values for the particular node and (ii) a variance for the particular node based on variances of the weight values for the particular node and the input values for the particular node; and
  randomly sampling from the computed node output value probability distribution for the particular node to determine the node output value for the particular node; and
  using the outputs generated for the plurality of inputs to train the weights.

11. The non-transitory machine-readable medium of claim 10, wherein the input values for the particular node are determined by randomly sampling from node output value probability distributions computed for a plurality of previous nodes.

12. The non-transitory machine-readable medium of claim 10, wherein the set of instructions for propagating the particular input through the neural network comprises, for each node of the set of the nodes, sets of instructions for:
  computing a node output value probability distribution by computing (i) a mean node output value for the node based on a dot product of means of the weight values for the node and and the input values for the node and (ii) a variance for the node based on variances of the weight values for the node and the input values for the node; and
  randomly sampling from the computed node output value probability distribution for the node to determine the node output value for the node.

13. The non-transitory machine-readable medium of claim 12, wherein each of the inputs of the plurality of inputs is propagated through the neural network by computing node output value probability distributions for each node of the set of nodes and randomly sampling from the computed node output value probability distributions.

14. The non-transitory machine-readable medium of claim 12, wherein the program further comprises a set of instructions for computing the means and variances of each of the weight values prior to propagating the plurality of inputs through the neural network.

15. The non-transitory machine-readable medium of claim 10, wherein the set of instructions for computing the variance for the particular node comprises sets of instructions for:
  for each input value for the particular node, multiplying a square of the input value by the variance of a weight value corresponding to the input value to compute an intermediate variance value for the input value; and
  summing the intermediate variance values for the input values for the particular node.

16. The non-transitory machine-readable medium of claim 10, wherein:
  each weight of the set of weights has a predefined probability distribution; and
  the set of instructions for using the outputs generated for the plurality of inputs to train the weights comprises a set of instructions for computing a value of a loss function comprising (i) a first term that measures error based on the generated outputs and (ii) a second term based on divergence of the probability distribution for each weight in the set of weights from the predefined probability distribution for the weight.

17. The non-transitory machine-readable medium of claim 16, wherein the set of instructions for using the outputs generated for the plurality of inputs to train the weights further comprises sets of instructions for:
  backpropagating the calculated loss function value through the neural network to determine, for each of the weights of the set of weights, a rate of change in the calculated loss function value relative to a rate of change in the weight; and
  modifying the probability distribution for each weight in the set of weights based on the determined rate of change for the weight.

18. The non-transitory machine-readable medium of claim 16, wherein for each weight of the set of weights, the second term increases as probability values for non-zero values of the set of allowable values for the weight increase.

* * * * *